United States Patent
Hoebel et al.

(10) Patent No.: US 7,124,869 B2
(45) Date of Patent: Oct. 24, 2006

(54) MULTI-PLATE CLUTCH, PARTICULARLY FOR A DOUBLE CLUTCH TRANSMISSION

(75) Inventors: Peter Hoebel, Neuhausen (DE); Michael Sternberg, Oberboihingen (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 11/202,073

(22) Filed: Aug. 12, 2005

(65) Prior Publication Data

US 2006/0006039 A1 Jan. 12, 2006

Related U.S. Application Data

(63) Continuation of application No. PCT/EP04/04190, filed on Apr. 21, 2004.

(30) Foreign Application Priority Data

May 2, 2003 (DE) .............................. 103 19 703.6

(51) Int. Cl.
*F16D 13/62* (2006.01)
*F16D 13/64* (2006.01)
(52) U.S. Cl. .................. 192/48.91; 192/70.2; 192/112
(58) Field of Classification Search ...................... None
See application file for complete search history.

(56) References Cited

U.S. PATENT DOCUMENTS

| 1,707,843 | A |   | 4/1929  | Byerlein              |
|-----------|---|---|---------|-----------------------|
| 2,214,592 | A | * | 9/1940  | Mueller ........... 310/60 R |
| 2,488,079 | A | * | 11/1949 | De Lavaud et al. ........ 310/105 |
| 3,623,579 | A | * | 11/1971 | Hendrickson et al. . 192/113.26 |
| 6,026,944 | A | * | 2/2000  | Satou et al. ............... 192/70.2 |
| 6,145,643 | A | * | 11/2000 | Pinschmidt et al. ..... 192/70.27 |
| 6,523,662 | B1 | * | 2/2003 | Orlamunder ............... 192/70.2 |
| 6,929,107 | B1 | * | 8/2005 | Hegerath ................. 192/87.11 |
| 2002/0053498 | A1 | * | 5/2002 | Orlamunder ............... 192/70.2 |

FOREIGN PATENT DOCUMENTS

| DE | 198 27 339 A 1 | 6/1998 |
| DE | 198 27 340 C 1 | 6/1998 |
| DE | 199 04 134 A1  | 2/1999 |
| JP |    01030929 A  | 2/1989 |

OTHER PUBLICATIONS

International Search Report, Apr. 21, 2003.

* cited by examiner

*Primary Examiner*—Rodney H. Bonck
(74) *Attorney, Agent, or Firm*—Crowell & Moring LLP

(57) ABSTRACT

A multi-plate clutch, particularly for a dual clutch transmission, has at least one clutch housing alternately holds externally and internally toothed plate disks, a hub arranged at the end face on the clutch housing. The hub has a central opening for receiving a gear shaft and openings disposed to reduce weight. Additional openings are provided in the lateral surface of the clutch basket, with at least a portion of the openings distributed over at least a section of the configured as triangular recesses.

8 Claims, 2 Drawing Sheets

MULTI-PLATE CLUTCH, PARTICULARLY FOR A DOUBLE CLUTCH TRANSMISSION

This application is a continuation of International Application No. PCT/EP2004/004190, filed Apr. 21, 2004, and claims the priority of German Patent Application No. DE 103 19703.6, filed May 2, 2003, the disclosure of which is expressly incorporated by reference herein.

BACKGROUND AND SUMMARY OF THE INVENTION

The invention relates to a multi-plate clutch, particularly for a dual clutch transmission.

From German Publication DE 199 04 134 A1 it is known to provide the hub of a clutch housing with recesses to save weight. From German Publication DE 198 27 340 C1 it is known to introduce openings or recesses in the lateral surface of a multi-plate clutch housing, again to save weight.

The object of the invention is to provide additional weight saving measures in a clutch housing with a hub for a multi-plate clutch so as to reduce the mass moments of inertia occurring during operation and at the same time ensure the dimensional stability of the clutch housing.

This object is attained by a multiplate clutch having at least one clutch housing alternately holding externally toothed and internally toothed plate disks, and having a hub arranged at an end face of the clutch housing in which a central opening is provided to received a gear shaft, and having openings arranged in the hub to reduce weight, wherein the openings are made in both the hub and a lateral surface of the clutch housing such that at least one row of the openings are distributed over an entire circumference of at least a first section of the lateral surface in the form of triangular recesses.

By combining recesses formed in the hub and on the lateral surface of the clutch housing, such that the openings distributed over the entire lateral surface are configured as triangular recesses, it is possible to reduce the weight and nevertheless preserve the necessary dimensional stability. With this weight reduction, the mass moments of inertia can be reduced by up to 30% compared to a clutch housing structure without recesses.

Other advantageous embodiments and refinements of the multi-plate clutch include the following.

The triangular recesses formed in the clutch housing are aligned such that a strip of substantially constant width is obtained between at least two adjacent recesses. This achieves a truss-type bracing, which ensures the dimensional stability of the clutch housing despite the substantial weight reduction, even at high engine speeds.

Investigations have shown that if the corners for the recesses in the lateral surface of the clutch housing are rounded, the rigidity of the clutch housing can be further enhanced.

The clutch housing has a first lateral surface section, which is provided with the triangular recesses. A second lateral surface section of the clutch housing is provided with interior teeth for a non-rotatable engagement with the externally toothed disk plates. The exterior of the second lateral surface also has openings for weight reduction, which extend over the entire lateral surface.

The clutch housing forms part of a dual clutch transmission, in which an additional clutch housing is arranged concentrically to the outer clutch housing. The inner clutch housing has substantially the same axial width as the first lateral surface section of the outer clutch housing. This ensures that the added masses or radii of the two clutch housings in this area do not result in unacceptably high centrifugal forces or mass moments of inertia.

Other objects, advantages and novel features of the present invention will become apparent from the following detailed description of the invention when considered in conjunction with the accompanying drawings for example.

Figure 1:
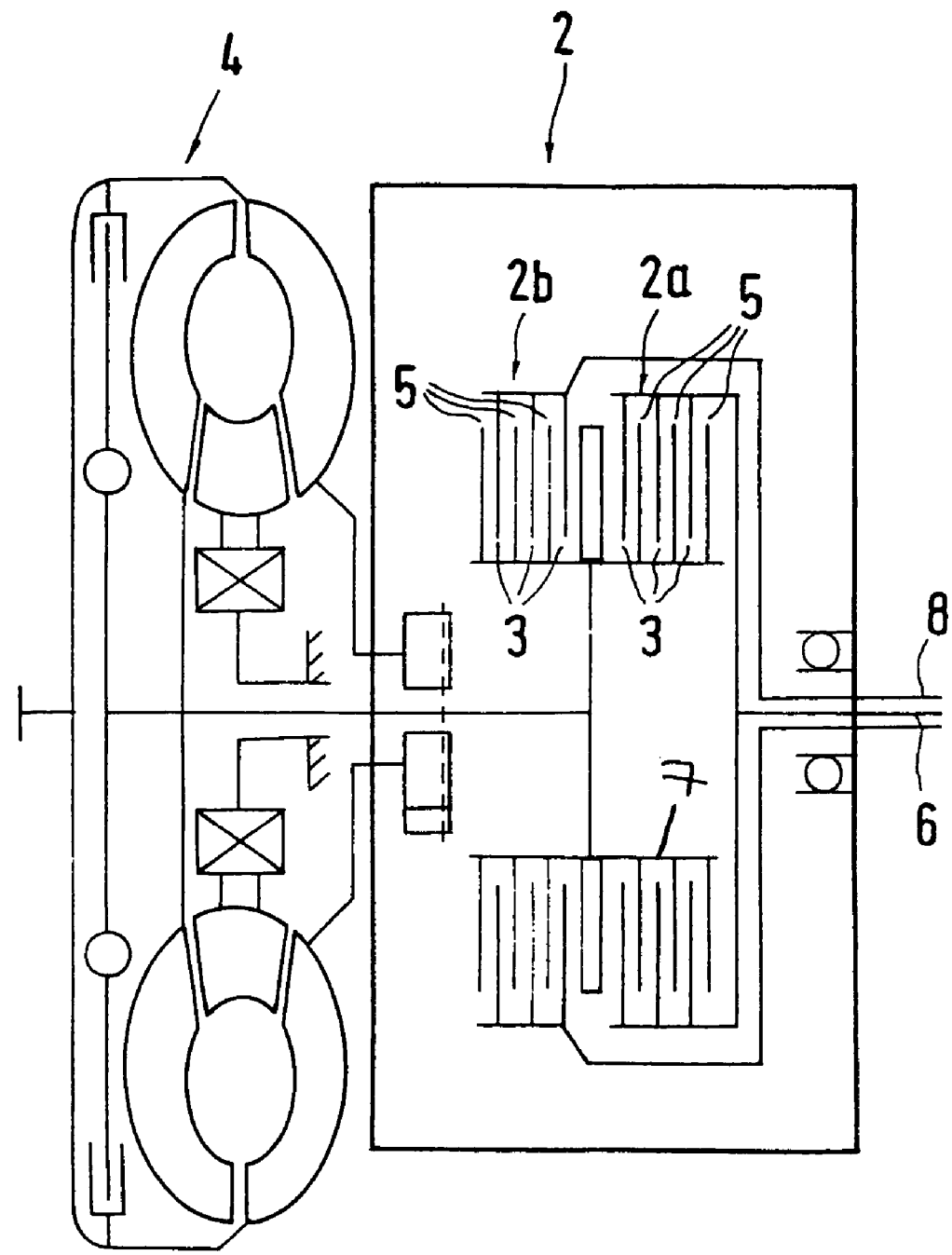
FIG. 1 is a schematic representation of a dual clutch arrangement including a multi-plate clutch in accordance with an embodiment of the present invention.

The multi-plate clutch 2 schematically shown in FIG. 1 forms part of a dual clutch arrangement, which on the input side is connected to an engine (not depicted) via a torque converter 4 and on the output side to two input shafts 6 and 8. The input shafts are rotationally fixed, respectively, to an inner clutch housing 2a and an outer clutch housing 2b, which are arranged concentrically to one another, as are the input shafts 6 and 8. In the two clutch housings 2a, 2b, externally toothed plate disks 3 and internally toothed plate disks 5 are arranged. The externally toothed plate disks 3 are rotationally fixed to the clutch housing 2a or 2b, while the internally toothed plate disks 5 are rotationally fixed to a disk carrier 7.

Figure 2:
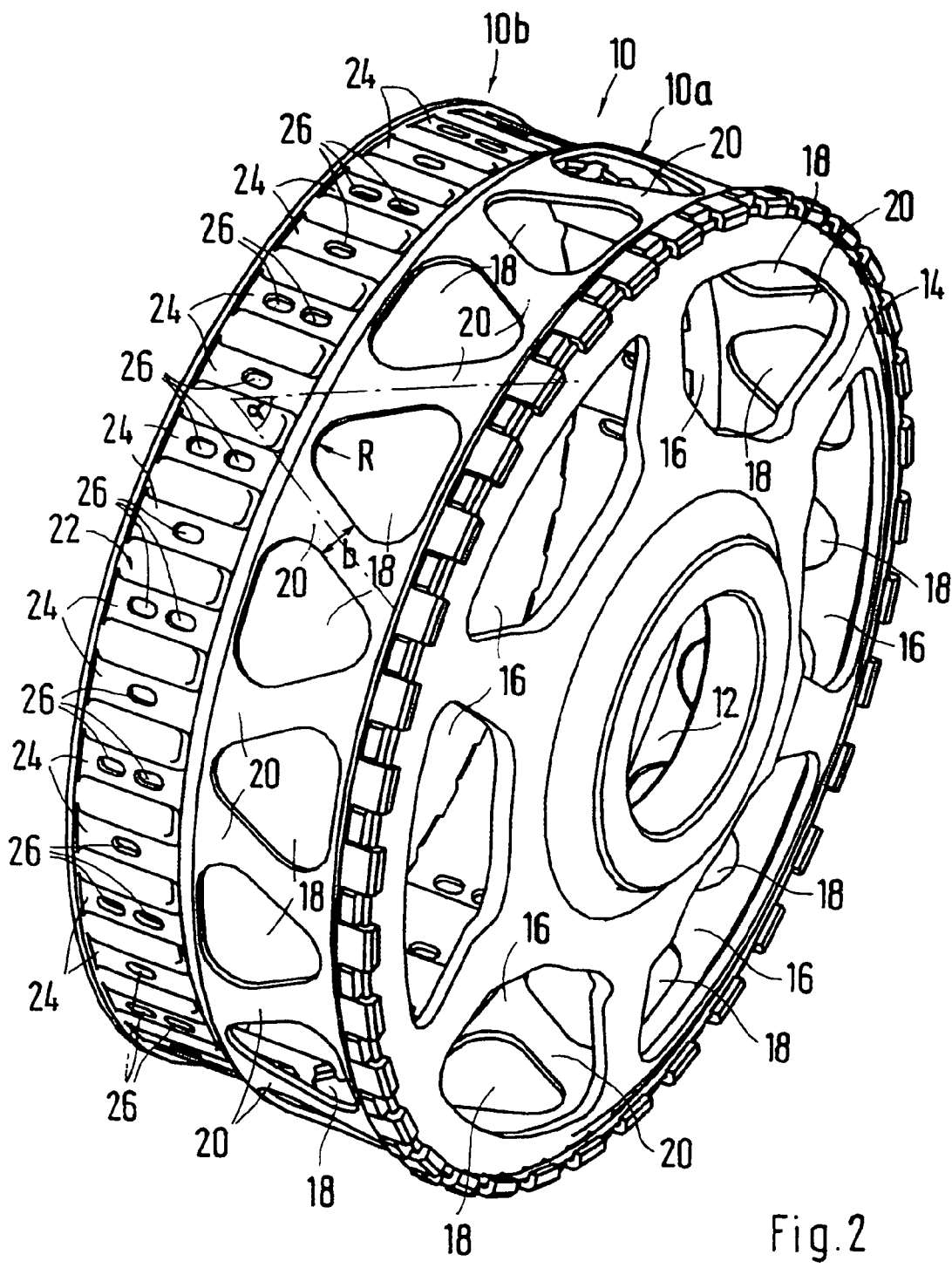
FIG. 2 shows a clutch housing of a multi-plate clutch in accordance with an embodiment of the present invention.

The structure of the outer clutch housing 2b illustrated in greater detail in FIG. 2 will now be described in more detail. The outer clutch housing 2b consists of a sheet metal body shaped without stock removal and having a cylindrical lateral surface 10, on the side of which a hub 14 is arranged, which has a central opening 12. The inner input shaft 6 engages with this central opening 12 in a positive locking manner by means of gear teeth (not depicted). In the hub 14, openings or recesses 16 are uniformly distributed around the central opening 12, such that the resulting spoke shape of the hub 14 helps reduce the weight of the clutch housing 2b. The lateral surface 10 of the clutch housing 2b has a first lateral surface section 10a in which triangular recesses 18 are uniformly distributed around its entire circumference. The recesses 18 are mutually aligned so as to form strips 20 having a substantially constant width b, such that two adjacent strips 20 are aligned at an angle α in relation to one another. This results in a truss-type bracing to ensure the rigidity of the clutch housing 2b required for high engine speeds despite the recesses 18 provided in the first lateral surface section 10a. The recesses 18, which are essentially configured as equilateral triangles, have a radius R in their corner regions. The second lateral surface section 10b adjoining the first lateral surface section is provided with internal teeth 22, with which the externally toothed plate disks 5 of the outer clutch housing 2b engage. Between the internal teeth 22, strips 24 are formed, which are likewise provided with oblong holes 26 to save weight. As a compromise between weight reduction and maintaining adequate dimensional stability, the strips 24 are alternately provided with one or two oblong holes 26.

Other objects, advantages and novel features of the present invention will become apparent from the following detailed description of the invention when considered in conjunction with the accompanying drawings for example, the above-described clutch housing structure of a multi-plate clutch is not limited to the described application in a dual clutch transmission, but can likewise be used in single manual or automatic transmissions.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Multi-plate clutch, having at least one clutch housing alternately holding externally toothed and internally toothed plate disks, and having a hub arranged at an end face of the clutch housing in which a central shaft opening is provided to receive a gear shaft, said clutch housing having weight reduction openings arranged to reduce weight in both the hub and a lateral surface of the clutch housing, such that at least one row of the weight reduction openings are distributed over an entire circumference of at least a first section of the lateral surface in the form of triangular recesses, and adjacent triangular recesses on the first section of the lateral surface alternate such that a strip with a substantially constant width results between adjacent triangular recesses.

2. Multi-plate clutch as claimed in claim 1, wherein corners of the recesses have a radius.

3. Multi-plate clutch as claimed in claim 2, wherein the first lateral surface section adjoins a second lateral surface section which is provided with teeth on an inside surface for a rotationally fixed connection with the externally toothed plate disks of the clutch housing.

4. Multi-plate clutch as claimed in claim 3, wherein weight reduction openings are also provided on an entire circumference of the second lateral surface section.

5. Multi-plate clutch as claimed in claim 4, wherein within the clutch housing is an outer clutch housing, and the multi-plate clutch further includes an inner clutch housing arranged concentrically to the outer clutch housing and likewise receives externally and internally geared plate disks, such that the inner clutch housing has substantially the same axial width as the first lateral surface section of the outer clutch housing.

6. Multi-plate clutch as claimed in claim 1, wherein the first lateral surface section adjoins a second lateral surface section which is provided with teeth on an inside surface for a rotationally fixed connection with the externally toothed plate disks of the clutch housing.

7. Multi-plate clutch as claimed in claim 6, wherein weight reduction openings are also provided on an entire circumference of the second lateral surface section.

8. Multi-plate clutch as claimed in claim 7, wherein within the clutch housing is an outer clutch housing, and the multi-plate clutch further includes an inner clutch housing arranged concentrically to the outer clutch housing and likewise receives externally and internally geared plate disks, such that the inner clutch housing has substantially the same axial width as the first lateral surface section of the outer clutch housing.

* * * * *